United States Patent Office 3,770,831
Patented Nov. 6, 1973

3,770,831
TRIS-(3-HALO-2-HYDROXYPROPYL)-HYDROXY-
METHYLPHOSPHONIUM CHLORIDE
Ludwig Maier, Zurich, Switzerland, assignor to Monsanto
Company, St. Louis, Mo.
No Drawing. Original application Nov. 18, 1970, Ser. No.
90,808, now Patent No. 3,681,126. Divided and this
application Apr. 5, 1972, Ser. No. 241,478
Claims priority, application Switzerland, Nov. 25, 1969,
17,836/69
Int. Cl. C07f 9/54
U.S. Cl. 260—606.5 F
2 Claims

ABSTRACT OF THE DISCLOSURE

Tris - (3 - halo-2-hydroxypropyl)-hydroxymethylphosphonium chloride compounds of the structure

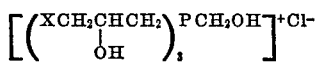

in which X signifies a halogen atom including a chlorine, bromine or iodine atom are provided. A method of producing these phosphonium chlorides also is disclosed. The compounds are useful for imparting flame resistance to combustible articles, particularly textile materials made from fibrous nylon. Also, these compounds serve as intermediate chemical for the preparation of other useful compounds.

BACKGROUND OF THE INVENTION

This is a division of application Ser. No. 90,808, filed Nov. 18, 1970, now U.S. Pat. 3,681,126.

It is well known to react tetrakis-(hydroxymethyl)-phosphonium chloride with ethylene oxide to yield the corresponding tris - (2-hydroxyethyl)-hydroxymethphosphonium chloride as disclosed by W. J. Vullo in I and EC Product Research and Development, vol. 5, p. 346 (1966). Furthermore, it is known that tris-(hydroxymethyl)-phosphine is converted to a quaternary compound by reaction with epichlorohydrin by the opening of the oxa ring of the epichlorohydrin. The resulting product reacts further at 70 to 80° C. to yield a corresponding bisphosphonium monochloride. Such disclosure is found in West German Pat. 1,067,811, filed Jan. 30, 1957. The bis command, however, contain only one ionically linked chlorine atom. These known compounds have certain disadvantages when used to reduce flammability of textile articles.

SUMMARY OF THE INVENTION

This invention is concerned with tris-(3-halo-2-hydroxypropyl)-hydroxymethyl phosphonium chlorides of the general formula

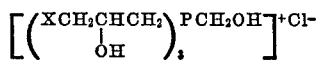

where X is a halogen. In accordance with the present invention, tetrakis(hydroxymethyl)phosphonium chloride is reacted with an α-epihalohydrin in a molar ratio of 1:3 to obtain the quaternary tris-(3-halo-2-hydroxy-propyl)-hydroxymethylphosphonium chloride.

DETAILED DESCRIPTION

Tetrakis-(hydroxymethyl)-phosphonium chloride is used as a starting compound, and the preparation thereof is known already. The reaction of the phosphonium chloride with an α-epihalohydrin is expeditiously carried out in aqueous solution at a pH of from about 8 to 9. To bring the aqueous solution of the phosphonium chloride to this pH range an alkali, such as a hydroxide of lithium, sodium, potassium, rubidium or cesium, the carbonates of these metals and ammonia, is added to the aqueous solution. The α-epihalohydrin is slowly added whereupon the pH of the solution increases. The pH is maintained in the desired range by the addition of a suitable acid such as HCl. The reaction proceeds with evolution of heat. The temperature of the reaction mixture is preferably kept in the range of from about 15 to 30° C. The reaction proceeds with, for example, α-epichlorohydrin virtually quantitatively according to the equation

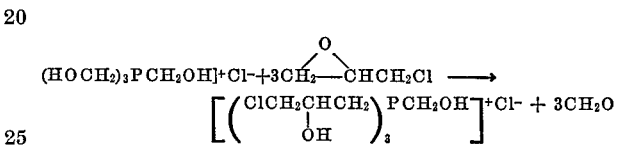

The reaction solution should be neutralized before the isolation of the product. The isolation can be achieved by evaporation and extraction with ethyl alcohol or other suitable solvent. However, it will be appreciated that the aqueous solution obtained may also be used for further conversions into other compounds.

The following example is illustrative of the invention.

EXAMPLE

A solution of 19.0 grams (0.1 mol) of $(HOCH_2)_4PCl$ in 10 mls. of water was brought to a pH of 8.3 by the addition of 5 N-potassium hydroxide solution. Then, 27.7 grams (0.03 mol- of α - epichlorohydrin (1 - chloro-2,3-epoxypropane) were added by drops. The temperature of the reaction medium was kept at about 20 to 30° C. by cooling with ice; and the pH of the medium was maintained between 8 and 9 by addition of hydrochloric acid (1:1). After the mixture had been allowed to stand for 18 hours, the solution was concentrated by evaporation. The residue of evaporation was dissolved in ethyl alcohol. The precipitated KCl was filtered off. The filtrate is completely concentrated and dried at 180° C. in vacuo. Thirty-seven grams of $[ClCH_2CHOH_2)_3PCH_2OH]^+Cl^-$, a highly viscous, slightly yellowish oil, were produced. This is 97.9% of the theoretical yield.

The resulting product was analyzed by high resolution nuclear magnetic reasonance spectroscopy. The chemical structure of tris-(3-chloro - 2 - hydroxypropyl)hydroxymethylphosphonium chloride was confirmed.

The novel compounds are pre-eminently suitable for flame-proofing combustible materials such as polyesters, polyurethanes, polyamides (nylons), polyhydrocarbons, cellulose, cellulose derivatives, paper and wood. The liquid compounds may be incorporated into the polymers in similar manner to the use of polymer plasticizing agents. Textiles, paper and wood may advantageously be impregnated with an aqueous or alcoholic solution containing suitable amounts of the phosphonium compounds. In general, the amount of phosphonium compound added to the base combustible material will range from 0.5 to 20 weight percent.

The compounds of the present invention are noted for their stability. They are very stable compared to the relatively instability of tetrakis - (hydroxymethyl) - phosphonium chloride and tris - (2 - hydroxyethyl)-hydroxymethylphosphonium chloride somewhat related prior art compounds used for reducing the flammability of combustible products. The presently claimed products contain both hydroxy groups and non-ionically linked halogen atoms. Consequently, they possess the advantages of both of the just-mentioned hydroxylated and chlorinated compounds but with surprisingly enhanced stability.

Additionally, tris - (3 - halo - 2 - hydroxypropyl) - hydroxymethylphosphonium chlorides are valuable intermediates for the production of other chemical compounds. According to U.S. patent application Ser. No. 90,787 filed simultaneously herewith (now U.S. 3,666,543), the compounds prepared herein can be converted to tris-(3-halo-2-hydroxypropyl)-phosphone oxides.

What is claimed is:
1. Tris - (3 - halo - 2 - hydroxypropyl) - hydroxymethylphosphonium chloride of the formula

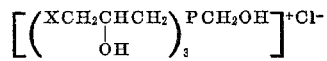

in which X is a chlorine, bromine or iodine atom.

2. Tris - (3 - chloro - 2 - hydroxypropyl) - hydroxymethylphosphonium chloride.

References Cited

UNITED STATES PATENTS 3,452,098   6/1969   Vullo ---------- 260—606.5 F
3,404,187   10/1968  Kober et al. ----- 260—606.5 P WERTEN F. W. BELLAMY, Primary Examiner